(12) United States Patent
Shoji et al.

(10) Patent No.: US 6,907,207 B2
(45) Date of Patent: Jun. 14, 2005

(54) SEALING MATERIAL FOR ROTARY BODY, USAGE OF THE SAME, AND DEVELOPING APPARATUS

(75) Inventors: Susumu Shoji, Kobe (JP); Kazuo Fukui, Kobe (JP)

(73) Assignees: T & M Corporation, Kobe (JP); Sanwa Techno Co., Ltd., Kobe (JP)

( * ) Notice: Subject to any disclaimer, the term of this patent is extended or adjusted under 35 U.S.C. 154(b) by 0 days.

(21) Appl. No.: 10/224,517

(22) Filed: Aug. 21, 2002

(65) Prior Publication Data

US 2003/0043361 A1 Mar. 6, 2003

(30) Foreign Application Priority Data

Aug. 22, 2001 (JP) .................................... P2001-252002

(51) Int. Cl.[7] .............................................. G03G 15/08
(52) U.S. Cl. ...................................... 399/103; 277/355
(58) Field of Search .................................. 399/102, 103, 399/105, 106; 277/355

(56) References Cited

U.S. PATENT DOCUMENTS

| | | | | |
|---|---|---|---|---|
| 4,681,426 A | * | 7/1987 | Bean et al. ................. | 399/102 |
| 4,908,238 A | * | 3/1990 | Vigo et al. | |
| 5,029,316 A | * | 7/1991 | Koiso .......................... | 399/102 |
| 5,488,462 A | * | 1/1996 | Ishikawa et al. ............ | 399/103 |
| 5,755,969 A | * | 5/1998 | Okamoto | |
| 5,895,149 A | * | 4/1999 | Weed | |
| 5,895,151 A | * | 4/1999 | Kinoshita et al. | |
| 6,049,689 A | * | 4/2000 | Ishii et al. | |
| 6,113,782 A | * | 9/2000 | Leonard | |
| 6,115,566 A | * | 9/2000 | Ohara et al. ................. | 399/103 |
| 6,229,979 B1 | * | 5/2001 | Ishii et al. | |
| 6,270,083 B1 | | 8/2001 | Hirschvogel et al. | |
| 6,352,263 B1 | | 3/2002 | Gail et al. | |
| 6,406,027 B1 | | 6/2002 | Aksit | |
| 6,620,746 B1 | * | 9/2003 | Jennergren et al. | |

FOREIGN PATENT DOCUMENTS

| | | | | |
|---|---|---|---|---|
| EP | 1 052 438 | 11/2000 | | |
| JP | 1026876 | 1/1989 | | |
| JP | B2-4-41350 | 7/1992 | | |
| JP | B2-4-41351 | 7/1992 | | |
| JP | 5-131595 | 5/1993 | | |
| JP | 405337342 A | * 12/1993 | ........... | B01D/63/02 |
| JP | 06027794 A | * 2/1994 | .......... | G03G/15/08 |
| JP | 6-16963 | 3/1994 | | |
| JP | Y2 7-50760 | 11/1995 | | |
| JP | 10-61871 | 3/1998 | | |
| JP | 10-505379 | 5/1998 | | |
| JP | 11-502906 | 3/1999 | | |
| JP | 2000-81143 | 3/2000 | | |
| JP | 2000-170922 | 6/2000 | | |
| JP | 2000234218 A | * 8/2000 | ............. | D01F/8/12 |
| JP | 2001-73708 | 3/2001 | | |
| JP | 2001-90842 | 4/2001 | | |
| JP | 2001134081 A | * 5/2001 | .......... | G03G/15/08 |
| WO | 96/07842 | 3/1996 | | |

* cited by examiner

*Primary Examiner*—Susan Lee
(74) *Attorney, Agent, or Firm*—Bacon & Thomas

(57) ABSTRACT

A rotary body sealing material device. The device prevents leakage of powder, by effectively sealing en end of a rotary body with a simple structure. An end seal which prevents toner leakage by contacting an outer circumference of a developing roller, has a contact portion made of a sealing material of yarns including porous hollow fibers. The seal, made of hollow fiber, exhibits reduced repulsive elasticity during compression, and high hermeticity is attained in the yarns by applying only a relatively light load to such an extent that deformation is not formed in a pressure-applying supporting plate and the to-be-pressed developing roller, thereby maintaining seal integrity.

12 Claims, 13 Drawing Sheets

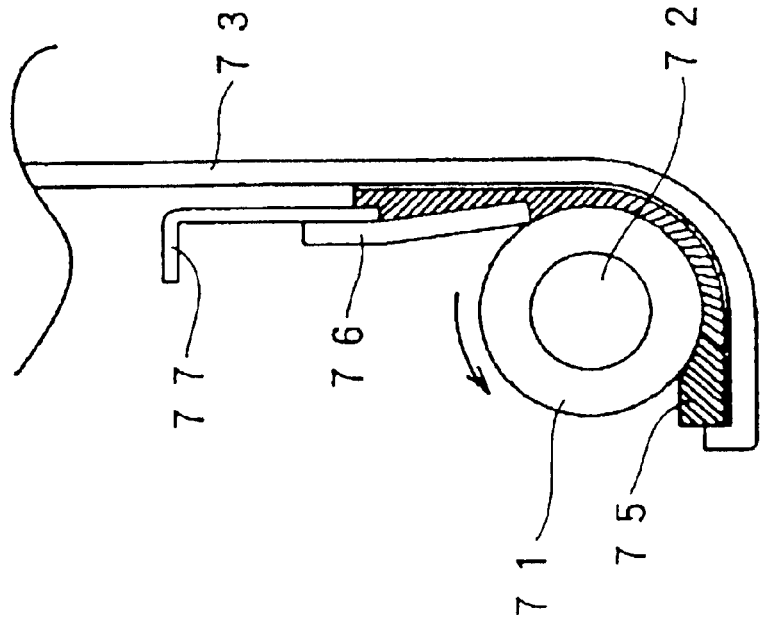
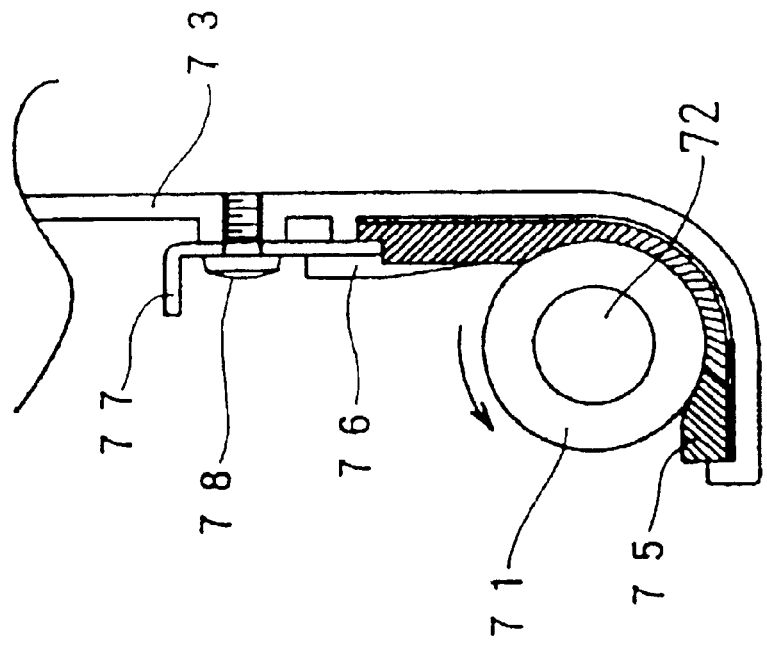

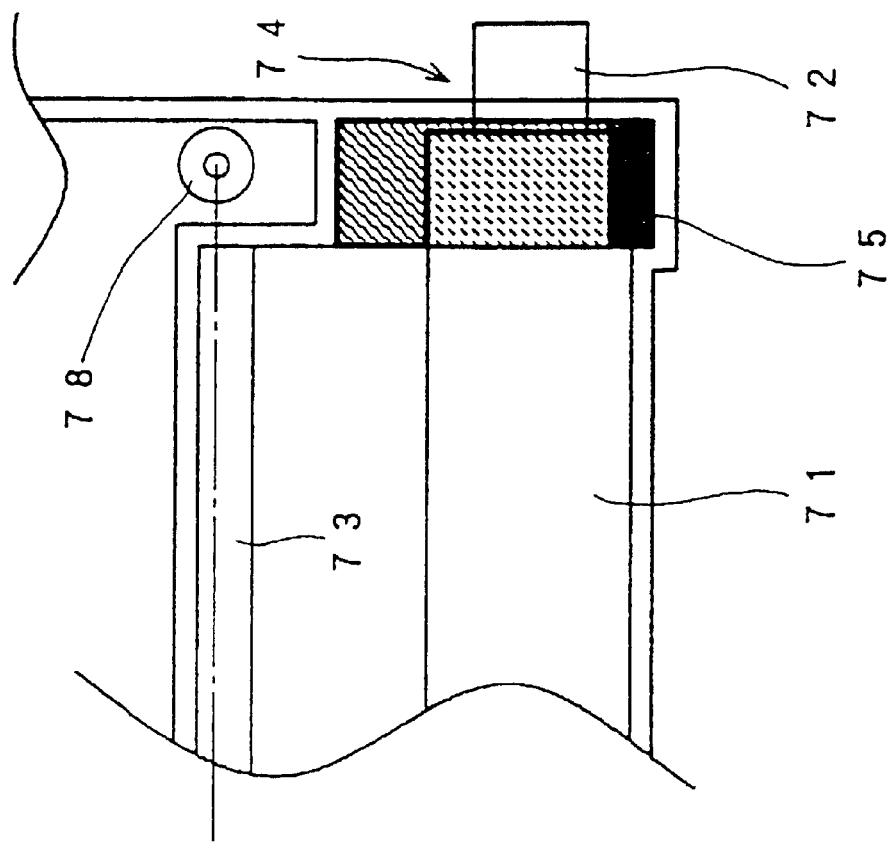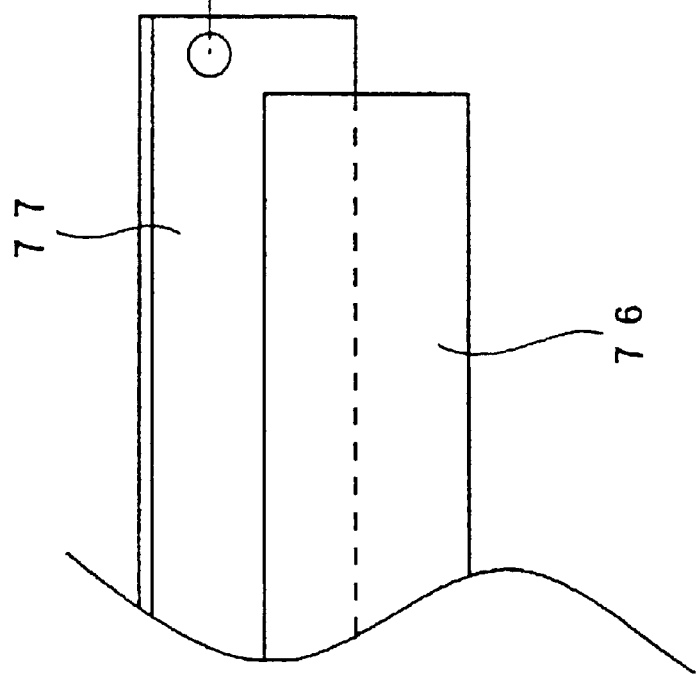

FIG. 7
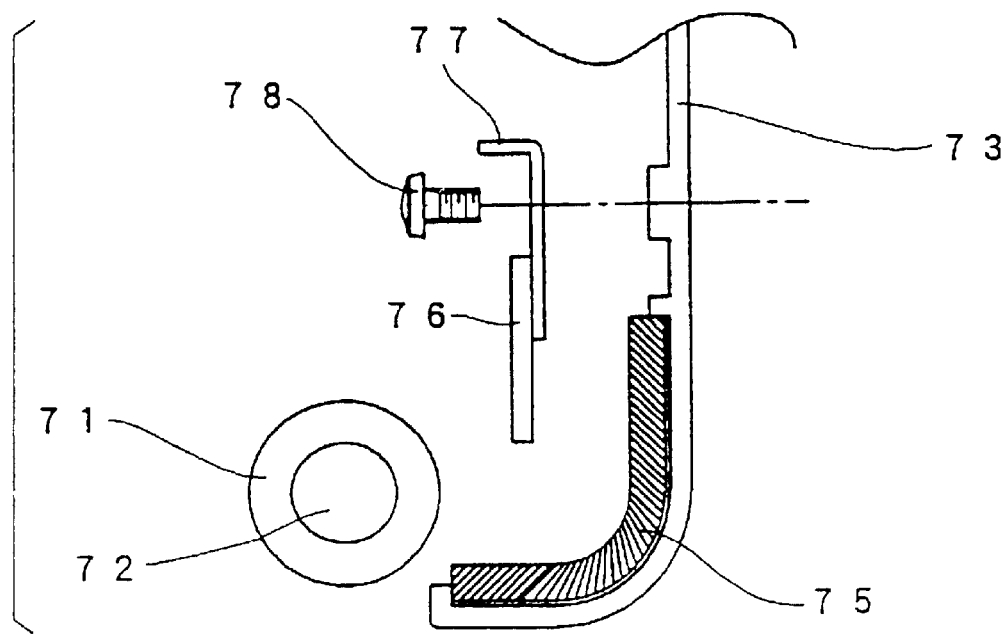
FIG. 8A    FIG. 8B
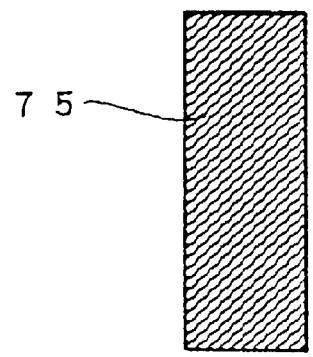
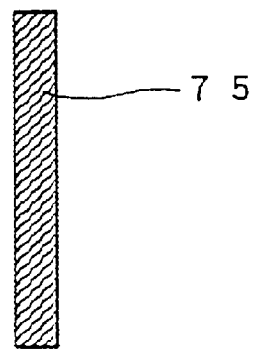

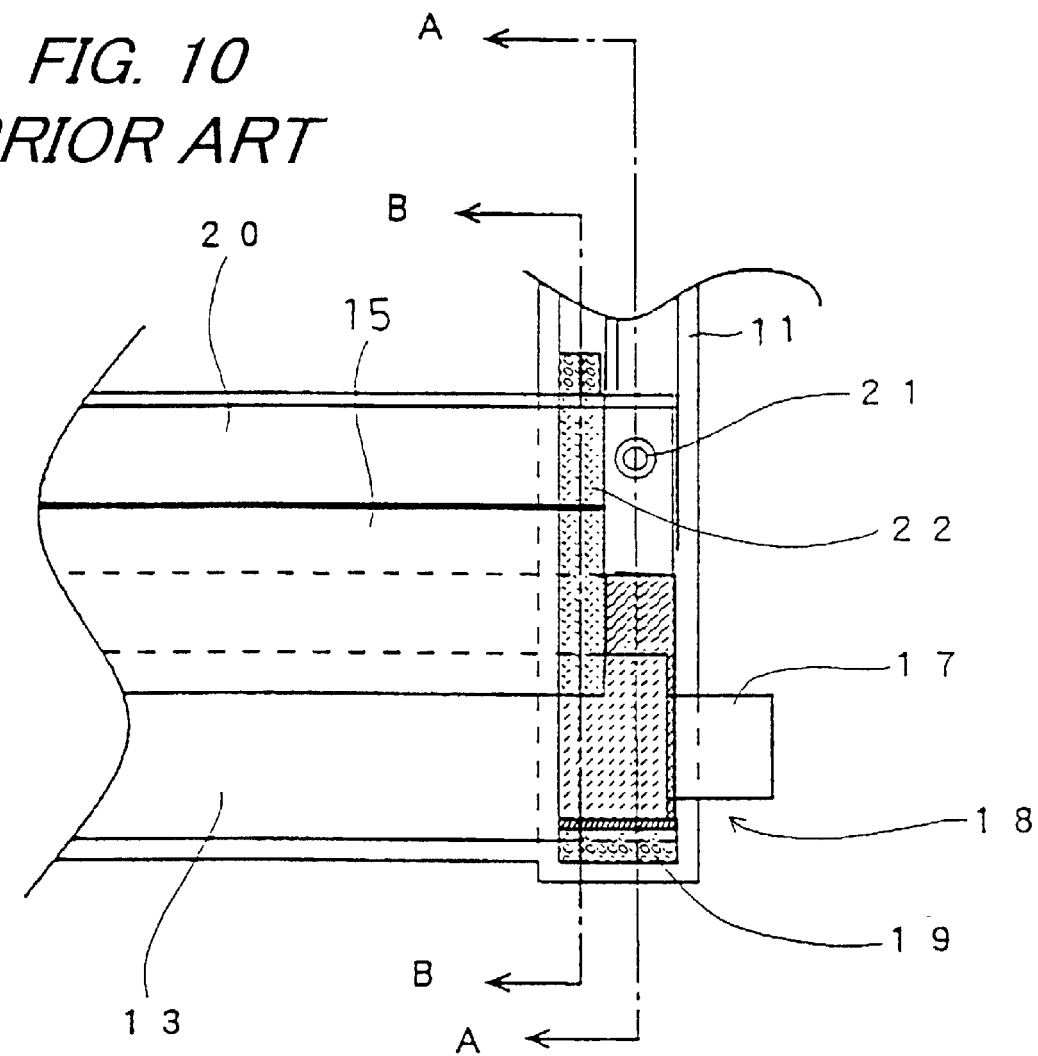

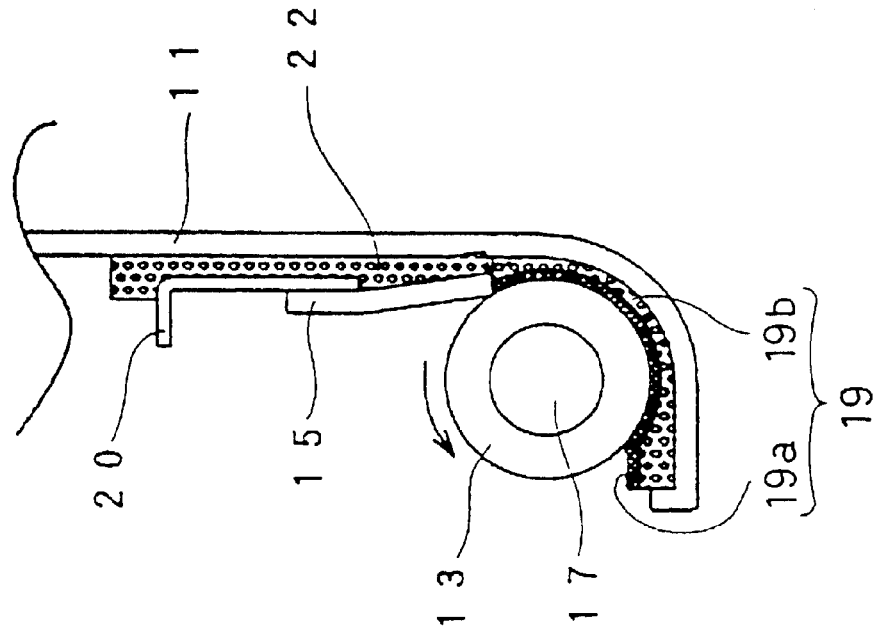
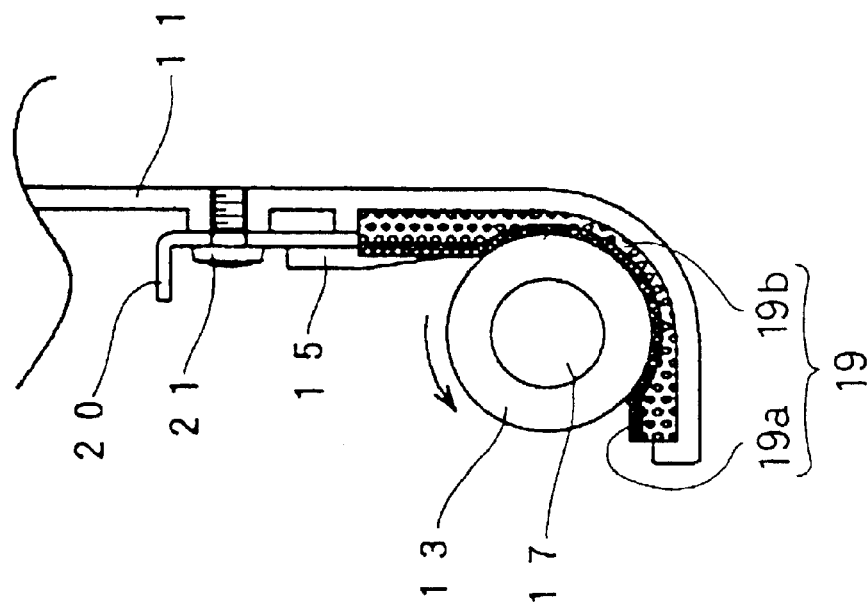

SEALING MATERIAL FOR ROTARY BODY, USAGE OF THE SAME, AND DEVELOPING APPARATUS

BACKGROUND OF THE INVENTION

1. Field of the Invention

The present invention relates to a sealing material for sealing an end portion of a rotary body, such as an image carrier, designed for use in electrophotographic image formation, to a usage of the sealing material, and to a developing apparatus.

2. Description of the Related Art

Conventionally, an electrophotography-based image forming method as shown in FIG. 9 has been adopted in a wide range of image forming apparatuses including a printer, a copying apparatus, and a facsimile apparatus. Electrophotographic image formation is carried out as follows. As a developer, fine-grained colored powder called toner is used. With the toner, an electrostatic latent image formed on a surface of a photoconductive drum 1, acting as an image carrier, is visualized, thus achieving development. On the surface of the photoconductive drum 1 is formed a photoconductive layer made of a photoconductive insulating substance, which normally exhibits electric insulation but exhibits conductivity when exposed to light. The photoconductive drum 1 is rotated in a rotation direction 1a, namely, in a clockwise direction as viewed in FIG. 9. To bring the surface of the photoconductive drum 1 into an electrically charged state, a charging device 2 is provided. Arranged on the downstream side of the charging device 2 along the rotation direction 1a is a developing apparatus 3. On the downstream side of the developing apparatus 3, a recording sheet 4 is supplied in contact with the photoconductive drum 1, and below the recording sheet 4 is arranged a transfer device 5. Arranged on the upstream side of the charging device 2 is a cleaning device 6. The recording sheet 4 is, after making contact with the photoconductive drum 1, conveyed to a fixing device 7, and is then heated and pressurized by a heating roller 8 and a pressure-applying roller 9.

When light irradiation 10 is carried out on the surface of the photoconductive drum 1 uniformly charged by the charging device 2, an electrical charge remaining in the region exposed to light disappears, whereupon an electrostatic latent image is formed. The light irradiation 10, in the case of a laser printer for example, refers to application of beams of laser light whose luminescence intensity has been modulated in accordance with an image to be recorded, or, in the case of a copying apparatus, refers to application of light reflected from an surface of an original. The developing apparatus 3 supplies toner, i.e. charged powder of developer, to visualize the electrostatic latent image formed on the surface of the photoconductive drum 1. The toner has a highly insulating property. When corona discharging is conducted by means of the transfer device 5 so as for the toner to be charged with a polarity reverse to that of the toner, the toner deposited on the surface of the photoconductive drum 1 is sucked, and is then transferred to the surface of the recording sheet 4. The toner transferred onto the recording sheet 4 is, after being molten once under the heat and pressure applied by the fixing device 7, fixed to the surface of the recording sheet 4. The residual toner remaining on the surface of the photoconductive drum 1 is removed by the cleaning device 6, so that charging is performed by the charging device 2 without causing any inconvenience.

In the developing apparatus 3, toner 12 stored in a casing 11 is supplied, via a developing roller 13 placed in contact with the photoconductive drum 1, to the photoconductive drum 1. In order for the toner 12 within the casing 11 to be efficiently deposited on the surface of the developing roller 13, a supply roller 14 is provided. The supply roller 14 allows the toner 12 within the casing 11 to be agitatedly conveyed toward the developing roller 13 while making contact with the developing roller 13. A blade 15, acting as a developer regulating member, controls the amount of toner in such a way that the thickness of the toner layer, deposited on the outer circumference of the developing roller 13 rotating with respect to the casing 11 of the developing apparatus 3, is kept within a predetermined range. To charge the toner 12, DC power sources 16a and 16b are provided. The DC power sources 16a and 16b are so designed that a voltage to be applied to the supply roller 14 is higher in terms of absolute value, to allow the toner 12 to move smoothly from the supply roller 14 to the developing roller 13.

In the developing apparatus 3, although the toner 12 is supplied from the developing roller 13 to the photoconductive drum 1, part of it may possibly find its way into opposite sides of the developing roller 13, as viewed in a rotary axial direction thereof. To permit rotation, a rotary shaft of the developing roller 13 is supported with a gap left that is large enough to allow passage of fine-grained colored powder of toner 12. If the toner 12 is leaked from such a rotation supporting portion, the interior of the image forming apparatus gets soiled with the toner 12, resulting in a waste of the toner 12. To prevent leakage of the toner 12, a seal is provided around the opposite ends of the outer circumferential surface of the developing roller 13 in the rotary axial direction, and also around the rotary shaft.

In cases where one-component toner is used as a developer which is supplied from the developing apparatus 3, the blade 15 plays an important role in regulating the thickness of the toner 12 deposited onto the outer circumferential surface of the developing roller 13. Inconveniently, the toner 12 tends to enter, through the end portion of the blade 15, around the axial opposite sides of the developing roller 13. Intrusion of the toner 12 through the end portion of the blade 15 impairs the thickness-regulating effect brought about by the blade 15. Thus, to prevent intrusion of the toner 12 through the end portion of the blade 15, a sealing material needs to be additionally provided.

FIG. 10 illustrates the developing roller 13, with its one axial end kept in a sealed state. Note that the other axial end thereof is also kept in the same state. Specifically, a shaft 17 of the developing roller 13 is rotatably supported, at its axial opposite ends, in the casing 11 by a bearing 18. Provided at each of the opposite ends of the outer circumferential surface of the developing roller 13 is a side seal 19. The side seal 19 serves to prevent the toner 12 from leaking from the bearing 18, provided at the side wall of the casing 11, to the outside. In FIG. 9, for sake of simplicity, the blade 15 is shown as being one part of the casing 11. In reality, however, the blade 15 is provided independently of the casing 11, and is attached via a fitting plate 20 to the casing 11. The fitting plate 20 is fixed to the casing 11 with a bolt 21. On the rear side of the blade 15's end portion is provided a blade rear seal 22. The side seal 19 corresponding to the developing roller 13 and the blade rear seal 22 corresponding to the blade 15 partly overlap each other. A gap tends to be created in a seam between these seals.

FIGS. 11A and 11B illustrate the sectional configuration taken from the right-hand side of FIG. 10, with FIG. 11A showing a sectional view taken along line A—A of FIG. 10, and FIG. 11B showing a sectional view taken along line B—B of FIG. 10. As shown in FIG. 11B, a gap tends to be created in the seam between the side seal 19 and the blade rear seal 22, causing leakage of toner.

FIGS. 12A and 12B are views of the casing 11 incorporating the developing roller 13, the side seal 19, and the blade rear seal 22, and an assembly obtained by fitting the blade 15 to the fitting plate 20, illustrating how the latter is mounted in the former. FIG. 13 is a view of the casing 11 incorporating the side seal 19 and the blade rear seal 22, the assembly obtained by attaching the blade 15 to the fitting plate 20, and the developing roller 13, illustrating a state in which the assembly and the developing roller 13 are separated from the casing 11. FIGS. 14 and 15 illustrate the contours of the side seal 19 and the blade rear seal 22 in an unmounted state, respectively, with FIGS. 14A and 15A showing the front face, and FIGS. 14B and 15B showing the right-hand face. The side seal 19 has a double-layer structure: a layer made of a felt 19a formed on its top surface; and a layer made of a sponge-like elastic foamed material 19b formed on its back surface. Since the side seal 19 is placed in contact with the outer circumferential surface of the developing roller 13, the sliding resistance needs to be reduced. To achieve this, the felt 19a layer is provided on the top surface of the side seal 19.

Conventionally, an end portion of a rotary body has been sealed with a felt, a sponge, a sealing material obtained by laminating together a felt and a sponge, a pile-like sealing material, or the like. To achieve sealing satisfactorily, a sealing material in use is required to exhibit excellent adhesiveness with respect to the rotary body. In light of this, sealing against leakage of powder is conducted by strong compression or application of heavy pressing force. By so doing, the adhesiveness with respect to the rotary body can be enhanced, thereby preventing intrusion of powder into the sealed portion. In this case, however, an unduly large torque is developed in the rotary body, and this causes an excessive load in the rotary body, which is detrimental to the working life of the machine. Furthermore, during high-speed rotation, the friction between the sealing material and the sliding portion of the rotary body is undesirably increased, with the result that the roller suffers from quality degradation due to a temperature rise caused by frictional heat, and that the powder particles, if made from a resin material, soften due to the frictional heat and consequently stick together.

As shown in FIG. 9, in electrophotographic image formation, development is achieved by forming an electrostatic latent image on the photoconductive drum 1 acting as an image carrier, followed by selectively supplying charged toner from the developing apparatus 3. Therefore, not only the developing roller 13 rotating in the developing apparatus 3, but also the photoconductive drum 1 need to be subjected to sealing against toner leakage. In the cleaning device 6 in particular, the residual toner remaining on the outer circumferential surface of the photoconductive drum 1 must be removed thoroughly. Prior art techniques concerning sealing of a cleaner equivalent to the cleaning device 6 have been disclosed for example in Japanese Examined Patent Publications JP-B2 4-41350 (1992) and JP-B2 4-41351 (1992). Also in these prior art techniques, a sealing material is provided separately for a rear end portion of a cleaning blade and an end portion of an image carrier, and a felt or an elastic foamed material is used for forming the sealing material.

In sealing an end portion of a rotary body, such as the photoconductive drum 1 and the developing roller 13, for use in electrophotographic image formation, an enhancement of adhesiveness cannot be achieved without increasing the torque of the rotary body. An unduly large torque is detrimental to the working life of the machine. By contrast, if sealing is conducted under a light load to reduce the torque, the sealability is deteriorated, and thus powder particles enter the sealed region. As a result, the powder particles undesirably fall in drops or are scattered around. Furthermore, during high-speed rotation, the rotary body undergoes a sharp temperature rise because of heat caused by the friction between the sealing material and the rotary body. As a result, the powder particles, if made from resin, tend to soften and consequently stick together. To overcome such a drawback, it is necessary to make a structure for supporting the rotary body complicate and thus increase the number of constituent components.

As shown in FIG. 10, although the developing roller 13 has its side part sealed with the side seal 19 to prevent leakage of the toner 12, it is not likely that perfect sealing can be achieved in this manner. If leakage of the toner 12 occurs, the toner 12 filled in the casing 11 shown in FIG. 9 runs out quickly, resulting in an undesirable increase in the running cost. Furthermore, the periphery of the developing apparatus 3 is prone to getting soiled with the leaked toner 12. To avoid this, it is necessary to provide an additional component such as a cover for preventing the toner 12 contamination from spreading widely.

Preferred examples for forming the conventional side seal 19, i.e., a material for sealing the end portion of the developing roller 13, include a felt, a sponge, a sealing material obtained by laminating together a felt and a sponge, and a pile-like sealing material. For example, in the developing apparatus 3, in the case of using a felt, a felt made of polytetrafluoro ethylene, such as "Teflon" (trademark) having improved slidability is used, and, in the case of using a sponge, a silicon sponge having high hermeticity is used. However, to obtain high adhesiveness with respect to the developing roller 13, sealing against leakage of the toner 12 is conducted under strong compression or application of heavy pressing force. This leads to an increase in torque required for rotatably driving the developing apparatus 3, resulting in occurrence of abrasion and banding in the drive-transmission mechanism. By contrast, if the sealing is conducted under a light compressive force, the toner 12 finds its way into the side seal 19, and thus the interior of the apparatus gets soiled with the fall or scattering of the toner 12. As a result, the printing quality is degraded.

Regarding sealing of the blade 15, acting as an end-portion developer regulating member, and the developing roller 13, since there is a difference in level between these two components, to achieve satisfactory sealing, a plurality of sealing materials, including the side seal 19 and the blade rear seal 22, have hitherto been used to seal the end portion of the developing roller 13 and the rear surface of the blade 15 acting as an end-portion developer regulating member. Moreover, the sealing materials are put under strong compression. This leads to an increase in torque required for driving.

In the case of using a fibrous sealing material, if the sealing material is made of yarns of thick fiber in consideration of permanent deformation, its elasticity becomes high, and the torque required for driving is increased, resulting in a rise in the manufacturing cost. By contrast, if the sealing material is made of yarns of thin fiber, sufficient elasticity cannot be attained, resulting in the sealing material being leaky.

Further, in the conventional sealing material, when a sealing pressure is applied to obtain adequate sealability, heat is undesirably produced due to the friction between the developing roller 13 and the side seal 19's surface during high-speed rotation. Because of the resultant frictional heat, the toner 12 softens or is molten, and consequently the developer particles stick together.

SUMMARY OF THE INVENTION

An object of the invention is to provide a rotary body sealing material that, despite having a simple configuration, lends itself to effectively sealing an end portion of a rotary body to prevent leakage of powder.

Another object of the invention is to provide a usage of said sealing material.

Still another object of the invention is to provide a developing apparatus.

The invention provides a rotary body sealing material for sealing an end portion of a rotary body which carries powder particles, wherein yarns of hollow fiber or porous hollow fiber are included as raw materials.

According to the invention, to prevent leakage of toner particles in a rotary body carrying powder, for example a developing roller of a developing unit for use in an electrophotographic image forming apparatus, a sealing material is provided that includes yarns of hollow fiber or yarns of porous hollow fiber as raw materials. Simply by forming the sealing material using yarns of hollow fiber or yarns of porous fiber, repulsive elasticity inherent in a yarn is decreased, with the result that, even if a compressive load exerted on an outer circumferential surface of the rotary body is light, satisfactory sealing can be achieved. Since the compressive load is kept light, a torque of the rotary body can be reduced, resulting in an advantage in prolonging the working life of the rotary body. Moreover, since frictional heat produced in a sliding portion during high-speed rotation can be suppressed, the rotary body is free from an undesirable temperature rise, and powder particles, even if made of synthetic resin, are prevented from being molten and sticking together.

According to the invention, simply by bringing a sealing material, made of yarns of hollow fiber or porous fiber, into contact with the end portion of the rotary body carrying powder, repulsive elasticity inherent in a yarn is decreased, with the result that, even if a compressive load exerted on the outer circumferential surface of the rotary body is light, satisfactory sealing can be achieved. Since the compressive load is kept light, the torque of the rotary body can be reduced, resulting in an advantage in prolonging the working life of the rotary body. Moreover, since frictional heat produced in the sliding portion during high-speed rotation can be suppressed, the rotary body is free from an undesirable temperature rise, and powder particles, even if made of synthetic resin, are prevented from being molten and sticking together.

In the invention, it is preferable that the hollow fiber or the porous hollow fiber is included in yarns formed into a pile configuration.

According to the invention, a pile-like sealing material made of yarns of hollow or porous fiber is used for sealing. Since the sealing material is contacted on its tips of naps by the rotary body, even if a contact pressure exerted on the rotary body is low, sufficient sealability can be attained.

According to the invention, since the rotary body is subjected to sealing simply by bringing its surface into contact with the tips of naps of the yarns of hollow or porous fiber, even if the contact pressure is low, sufficient sealability can be attained.

In the invention, it is preferable that the yarns formed into a pile configuration are so treated as to lie down in a direction in which the rotary body is rotated.

According to the invention, since the yarns formed into the pile-like sealing material are so treated as to lie down in the rotation direction of the rotary body, a movement direction of powder is aligned with the rotation direction, thereby preventing the powder from moving in an axial direction of the rotary body.

According to the invention, since the yarns are so treated as to lie down with respect to the rotation direction of the rotary body, a movement direction of powder is aligned with the rotation direction, thereby preventing the powder from moving in the axial direction.

In the invention, it is preferable that yarns of hollow or porous hollow fiber and yarns of non-hollow fiber are mixedly woven.

According to the invention, the yarns of hollow or porous fiber exhibit low repulsive elasticity, whereas the yarns of non-hollow fiber exhibit high repulsive elasticity. Hence, by mixedly weaving these yarns of different types, the repulsive elasticity can be controlled adequately, and thus it is possible to impart elasticity to the resultant sealing material in part, as required.

According to the invention, by mixedly weaving the yarns of hollow or porous fiber and the yarns of non-hollow fiber, it is possible to impart elasticity to the resultant sealing material in part, as required.

In the invention, it is preferable that yarns of electrically conductive fiber are mixed.

According to the invention, yarns of electrically conductive fiber are mixed with the yarns used for forming the sealing material. This makes the resultant sealing material less prone to being friction-charged even when used for sealing a mobile portion, resulting in an advantage in reducing clogging caused by powder coagulation.

According to the invention, since yarns of electrically conductive fiber are mixed with the yarns used for forming the sealing material, the resultant sealing material becomes less prone to being friction-charged. As a result, clogging resulting from powder coagulation can be reduced.

The invention further provides a usage of a rotary body sealing material, wherein the rotary body sealing material set forth hereinabove is applied to a stepped portion.

According to the invention, part of the rotary body having a stepped configuration is subjected to sealing using a sealing material which can be deformed easily under a relatively light load. This makes it possible to achieve sealing satisfactorily against the axial movement of the powder.

According to the invention, the sealing material, even when used in part of the rotary body having a stepped configuration, can be deformed under a relatively light load. This makes it possible to achieve sealing satisfactorily against the axial movement of the powder.

The invention still further provides a developing apparatus that includes the rotary body sealing material set forth hereinabove as a side seal, the side seal being provided at an end portion of a developing roller carrying developer powder for use in electrophotographic image formation.

According to the invention, the developing roller has its end portion sealed with a sealing material having a pile configuration made of yarns including hollow or porous hollow fiber. Since the yarns formed into the sealing material include hollow or porous hollow fiber, the repulsive elasticity is decreased, with the result that, even if a compressive load exerted on an outer circumferential surface of the developing roller is light, satisfactory sealing can be achieved. Since the compressive load is kept light, a torque required for rotatably driving the developing roller, etc. can be reduced. Moreover, since the compressive force can be decreased, frictional heat produced in a sliding portion during high-speed rotation can be suppressed. As a result, the developing roller is free from an undesirable temperature rise, and the developer including synthetic resin and the like is prevented from being molten, with its powder particles being prevented from sticking together.

According to the invention, since the yarns formed into the sealing material for sealing the end portion of the developing roller include hollow or porous hollow fiber, the repulsive elasticity is decreased, with the result that, even if a compressive load exerted on the outer circumferential surface of the developing roller is light, satisfactory sealing can be achieved. Since the compressive load is kept light, a torque required for rotatably driving the developing roller, etc. can be reduced, and frictional heat produced in the sliding portion during high-speed rotation can be suppressed. As a result, the developing roller is free from an undesirable temperature rise, and the developer including synthetic resin and the like is prevented from being molten, with its powder particles being prevented from sticking together.

In the invention, it is preferable that the side seal is formed integrally with a rear seal at an end portion of a developer regulating member for controlling a layer thickness of a developer carried by the developing roller.

According to the invention, sealing between the side seal provided at the end portion of the developing roller and the rear end portion of the developer regulating member, for controlling the layer thickness of the developer carried by the developing roller, is achieved with the use of a sealing material having a pile configuration made of yarns including hollow or porous fiber. Since the yarns formed into the sealing material include hollow or porous hollow fiber, the repulsive elasticity is decreased, with the result that, even if a compressive load exerted on the outer circumferential surface of the developing roller is light, satisfactory sealing can be achieved. Since the compressive load is kept light, a torque required for rotatably driving the developing roller, etc. can be reduced. Moreover, since both the sealing of the end portion of the developing roller and the sealing of the rear end portion of the developer regulating member are conducted with the use of a single, common sealing material, cost reduction can be achieved.

According to the invention, sealing between the side seal provided at the end portion of the developing roller and the rear end portion of the developer regulating member, for controlling the layer thickness of the developer carried by the developing roller, is achieved with the use of a sealing material having a pile configuration made of yarns including hollow or porous hollow fiber. By so doing, the seal applied to the stepped portion is prevented from being leaky, and also cost reduction can be achieved.

BRIEF DESCRIPTION OF THE DRAWINGS

Other and further objects, features, and advantages of the invention will be more explicit from the following detailed description taken with reference to the drawings wherein:

FIG. 5A is a sectional view, taken along line A—A of FIG. 4;

FIG. 5B is a sectional view, taken along line B—B of FIG. 4;

FIGS. 6A and 6B are partial front views showing the developing apparatus depicted in FIG. 4, with a blade 76 removed;

FIG. 7 is a simplified right-hand side view showing the developing apparatus depicted in FIG. 4, with the blade 76 and the developing roller 71 removed;

FIGS. 8A and 8B are a front view and a right-hand side view, respectively, each showing the side seal 75 of FIG. 4 kept in an unmounted state;

FIG. 10 is a partial front view showing how to use a side seal 19 and a blade rear seal 22 for sealing end portions of a developing roller 13 and a blade 15, in the developing apparatus 3 depicted in FIG. 9;

FIG. 11A is a sectional view, taken along line A—A of FIG. 10;

FIG. 11B is a sectional view, taken along line B—B of FIG. 10;

DETAILED DESCRIPTION OF THE PREFERRED EMBODIMENTS

Figure 1A:
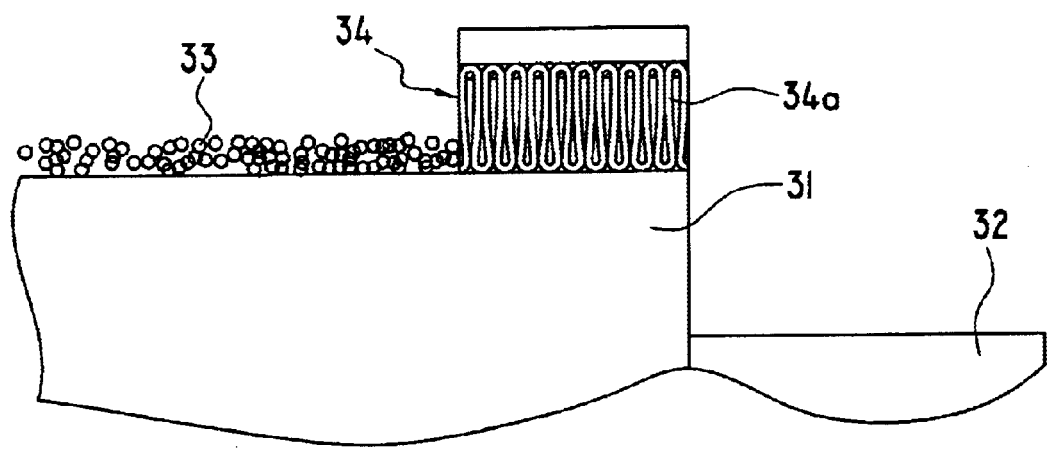
FIG. 1A is a partial sectional view showing how to use a sealing material 34 exemplified as one embodiment of the invention.

Now referring to the drawings, preferred embodiments of the invention are described below.

Figure 1B:
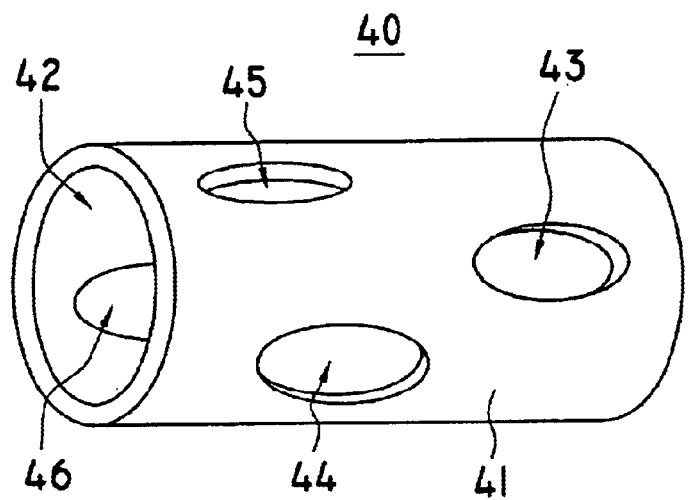
FIG. 1B is a view schematically showing a structure of porous hollow fiber 40 employed as a raw material.

FIGS. 1A and 1B respectively illustrate a partial sectional configuration of a developing apparatus exemplified as one embodiment of the invention, and a shape of a fiber used as a raw material for production of a sealing material, which is formed into a side seal of the developing apparatus. Specifically, FIG. 1A illustrates the structure of the principal portion of the developing apparatus. In FIG. 1A, a developing roller 31, which is disposed in a developing unit of an electrophotographic image forming apparatus, is provided with a sealing material 34. The pile configuration of the pile fabric is shown at 34a. During the rotation of the developing roller 31 about a rotary shaft 32, the sealing material 34 serves to prevent leakage of toner 33 carried by the developing roller 31. The sealing material 34 makes intimate contact with the outer surface of the developing roller 31 to block the movement of the toner 33, thereby preventing the toner 33 from leaking to the axial end portion of the developing roller 31. The sealing material 34 having a pile configuration is subjected to treatment such that naps of its yarns lie down in the rotation direction. On the radially outer side of the sealing material 34 is disposed a supporting plate 35 made of metal or hard synthetic resin. The sealing material 34 and the supporting plate 35 constitute an end seal 36 designed for use in the developing roller 31.

FIG. 1B schematically illustrates a structure of a porous hollow fiber 40 included in a raw material for production of the sealing material 34 shown in FIG. 1A. The sealing material 34 is formed as a pile fabric. This fabric material is made of yarns of the porous hollow fiber 40 which is hollow-bodied, and has a multiplicity of pores formed therein. Taken up as a preferred example of such porous hollow fiber is acrylic fiber marketed by Kanebo Ltd. under the trademark "BIOSAFE". This acrylic fiber is made from raw cotton added with an antimicrobial odor-eating agent to provide bacteria-control and odor-eliminating effects. The target applications thereof include: bedding products such as blankets, sheets, and towels; interior products such as curtains and carpets; garment products such as under wears, tights, and sweaters; and material products such as filters of various type. As a raw material for production of a filter for use in a water-purification system, a hollow nylon fiber is used.

The porous hollow fiber 40 has its center portion hollowed out, with an outer circumference 41 left intact, thereby forming a central hole 42. On the outer circumference 41 are formed a multiplicity of holes 43, 44, 45, and 46. The central hole 42 is so formed as to penetrate through the fiber as a whole longitudinally. The holes 43, 44, 45, and 46 provide communication between the surface of the outer circumference 41 and the central hole 42. The porous hollow fiber 40, having such a configuration, exhibits reduced repulsive elasticity when subjected to compression. Reduction in the repulsive elasticity developed during compression can also be achieved in hollow fiber in which the holes 43, 44, 45, and 46 are absent.

Figure 2:
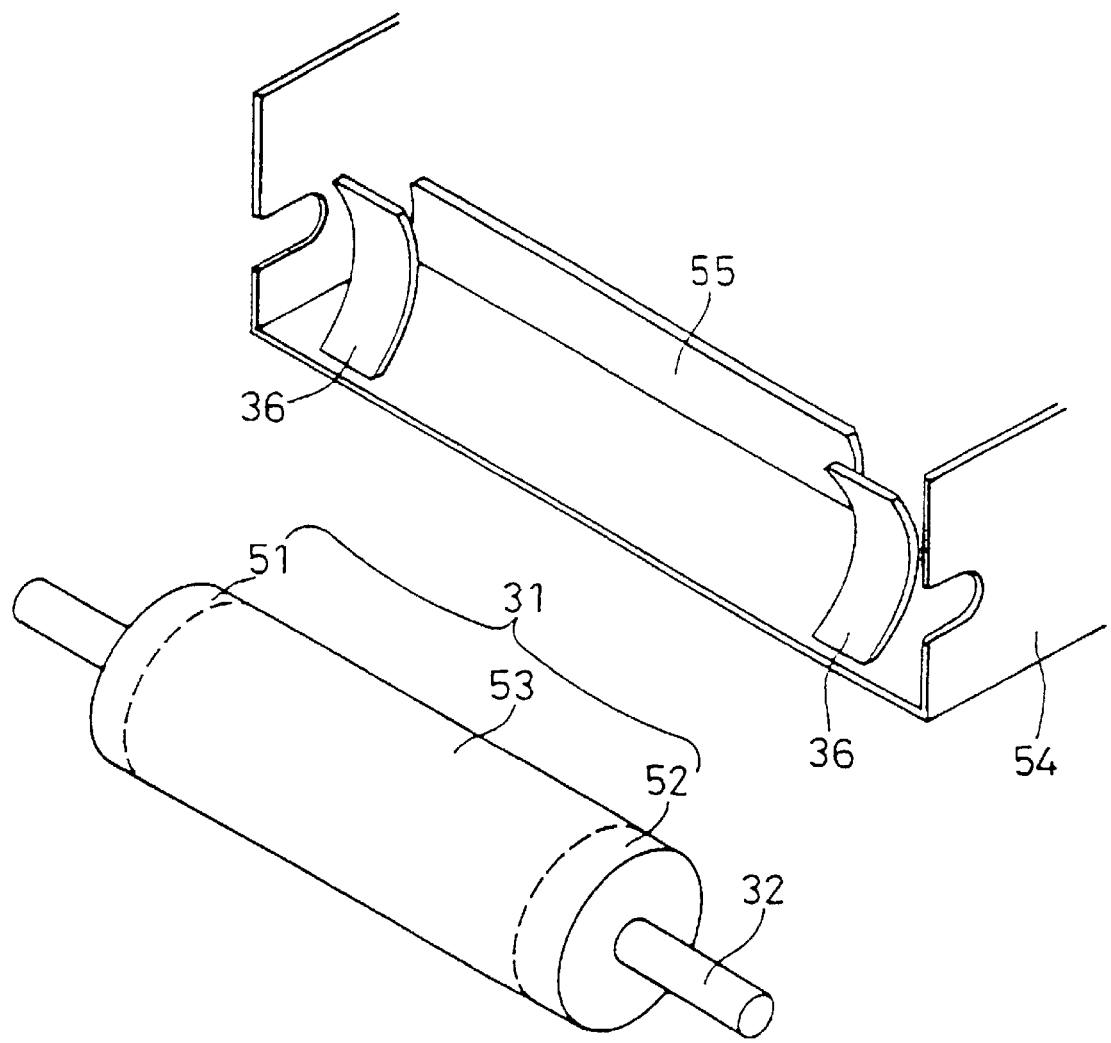
FIG. 2 is a partial exploded perspective view showing a developing unit including an end seal 36, which includes the sealing material 34 depicted in FIG. 1, and a developing roller 31.

FIG. 2 illustrates the relationship between the end seal 36 shown in FIG. 1A and the outer circumferential surface of the developing roller 31. The end seal 36 functions as a side seal with respect to the outer circumferential surface of the developing roller 31. The end seal 36 makes intimate contact with the outer circumferential surface of the developing roller 31. At the axial opposite ends thereof are provided blank portions 51 and 52 free of toner deposition, and between the blank portions 51 and 52 is formed a toner layer 53 in accordance with the printing width. The rotary shaft 32 of the developing roller 31 is rotatably supported by a casing of a developing unit 54. The toner layer 53 of the developing roller 31 receives toner from the interior of the developing unit 54. In the toner layer 53, its toner thickness is so adjusted as to be kept within a predetermined range by a blade 55 acting as a toner regulating member. By designing the sealing material 34 of the end seal 36 such that the yarns formed into the pile-like seal are caused to lie down in the rotation direction, the movement direction of the toner is aligned with the rotation direction, thereby preventing the toner from moving in the axial direction.

Figure 3:
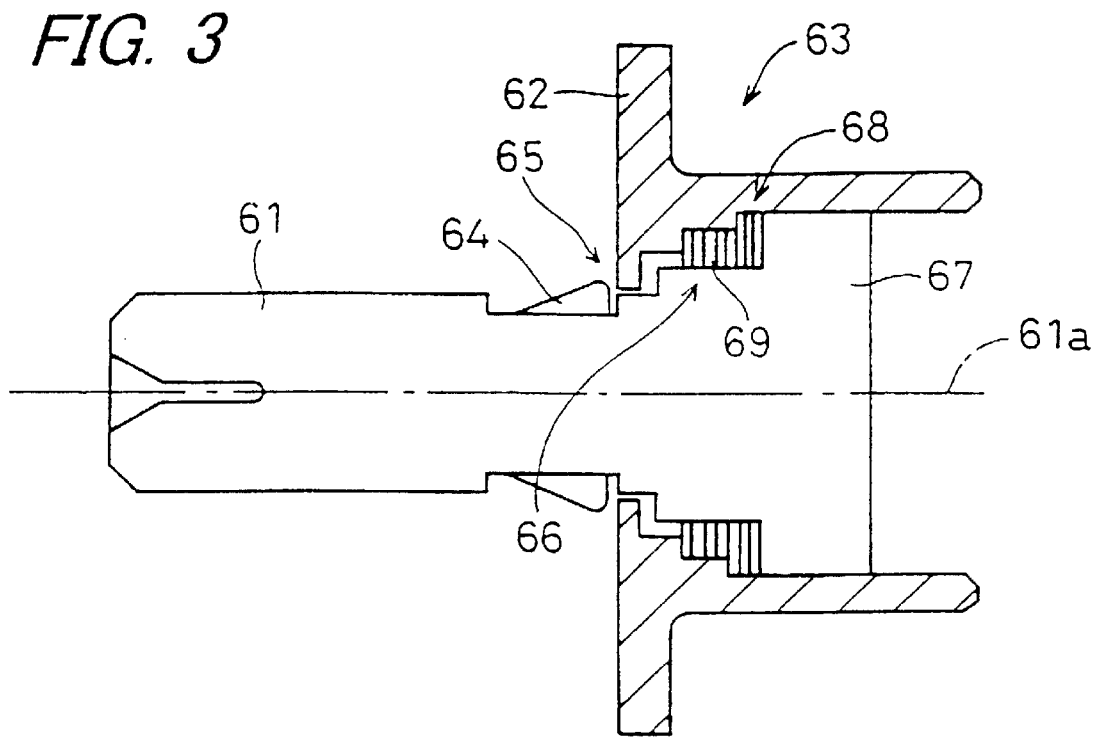
FIG. 3 is a sectional view showing how to use a sealing material 69, as another embodiment of the invention, applied to a stepped portion.

FIG. 3 illustrates a structure of a rotary body sealing material exemplified as another embodiment of the invention. An electrophotographic developing roller 61 is rotatably supported by a bearing 63 of a casing of a developing unit 62. The developing roller 61 is made insertable into the developing unit 62 from the outside of the casing. Upon completion of insertion, a coming-off preventive portion 64 juts out under un urging force exerted by a spring, thereby preventing the developing roller 61 from coming off. The coming-off preventive portion 64 is disposed inwardly than the bearing 63 of the developing unit 62's casing with respect to an axis 61a of the developing roller 61. Part of the coming-off preventive portion 64 opposed to the bearing 63 is formed into a sliding portion 65. Formed outwardly of the sliding portion 65 is a seal receiving portion 66. The developing roller 61 has, on its outermost side, an end portion 67 having a maximum diameter. In the casing of the developing unit 62 is formed a step height 68 so as to face the seal receiving portion 66 at the end portion of the developing roller 61. Between the casing of the developing unit 62 including the step height 68 and the seal receiving portion 66 on the developing roller 61 side is inserted a felt-like sealing material 69 made of yarns including the porous hollow fiber 40 as shown in FIG. 1B. Even if the step height 68 exists, by using such a sealing material 69, leakage of toner can be prevented effectively. Note that, by mixedly weaving yarns of porous hollow fiber and yarns of non-hollow fiber, it is possible to impart elasticity to the resultant sealing material and adjust its repulsive elasticity. Also, by mixedly weaving yarns of porous hollow fiber and yarns of electrically conductive fiber, the resultant sealing material is made less prone to being friction-charged, resulting in an advantage in reducing clogging caused by toner coagulation.

FIGS. 4 through 8 illustrate a partial structure of a developing apparatus exemplified as still another embodiment of the invention.

Figure 4:
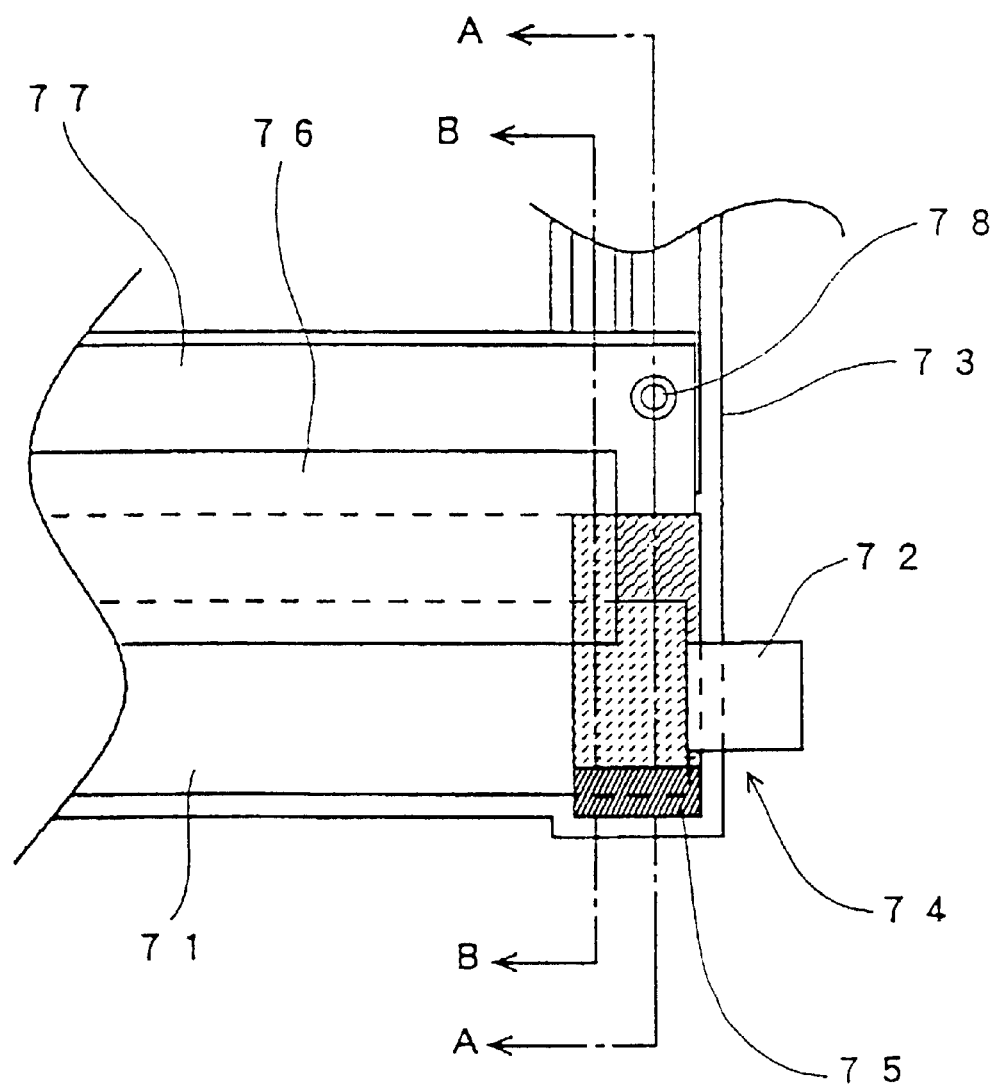
FIG. 4 is a partial front view showing how to use a side seal 75, as still another embodiment of the invention, for sealing end portions of a developing roller 71 and a blade 75 in a developing apparatus.
Figure 9:
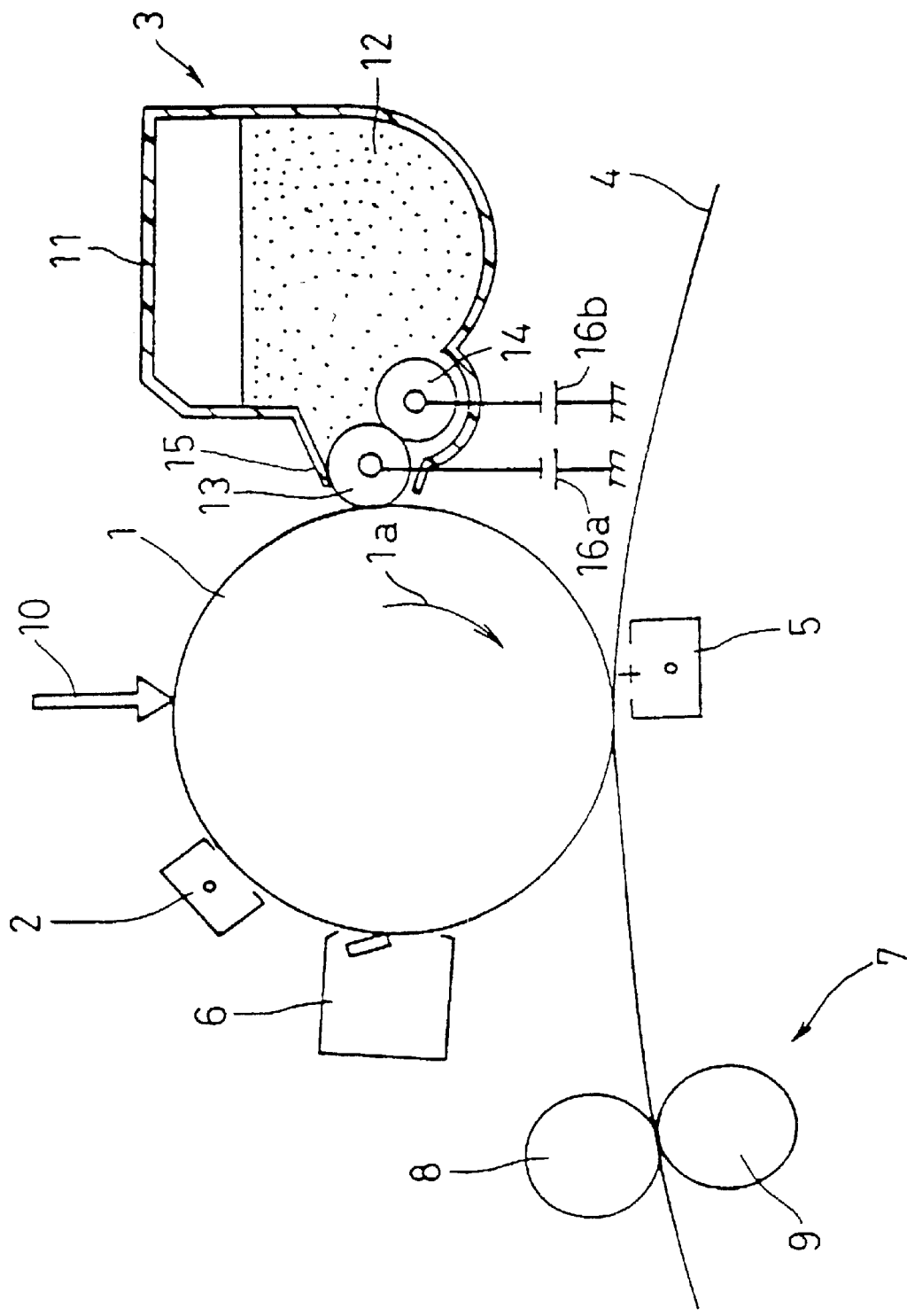
FIG. 9 is a simplified side sectional view showing a basic construction for use in conventional electrophotographic image formation.
Figure 12B:
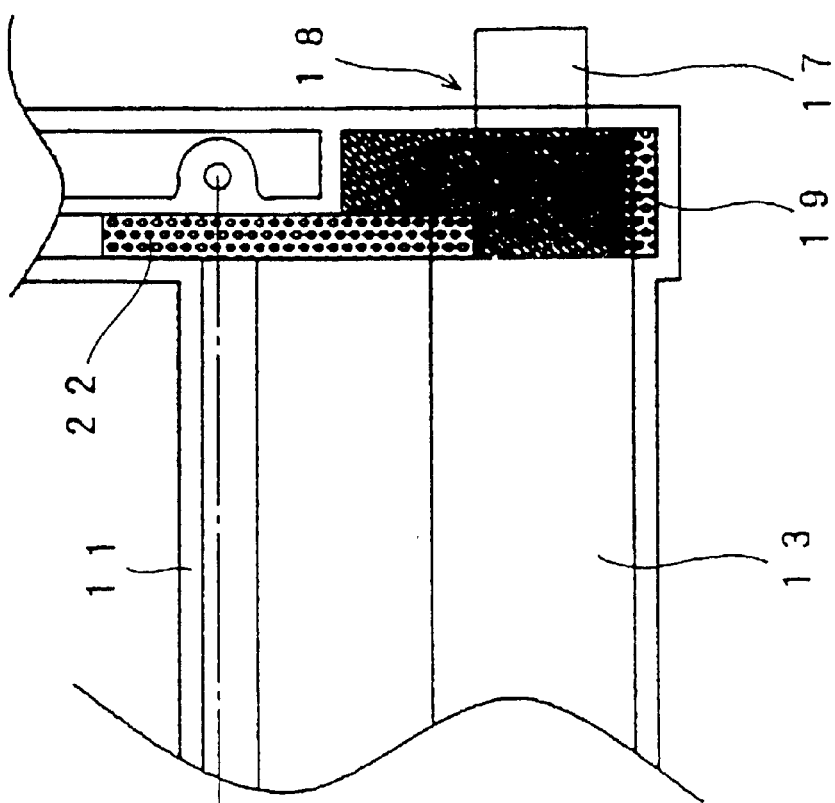
FIGS. 12A and 12B are partial front views showing the developing apparatus 3 depicted in FIG. 10, with the blade 15 removed.
Figure 12A:
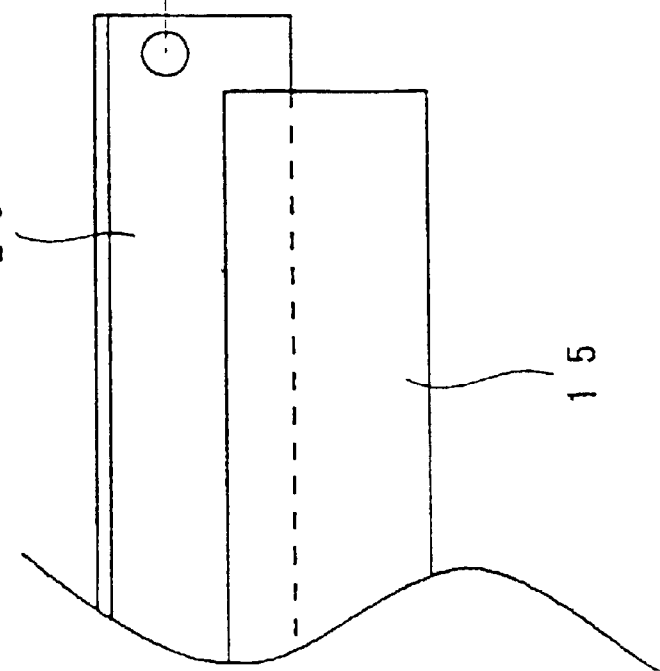
Figure 13:
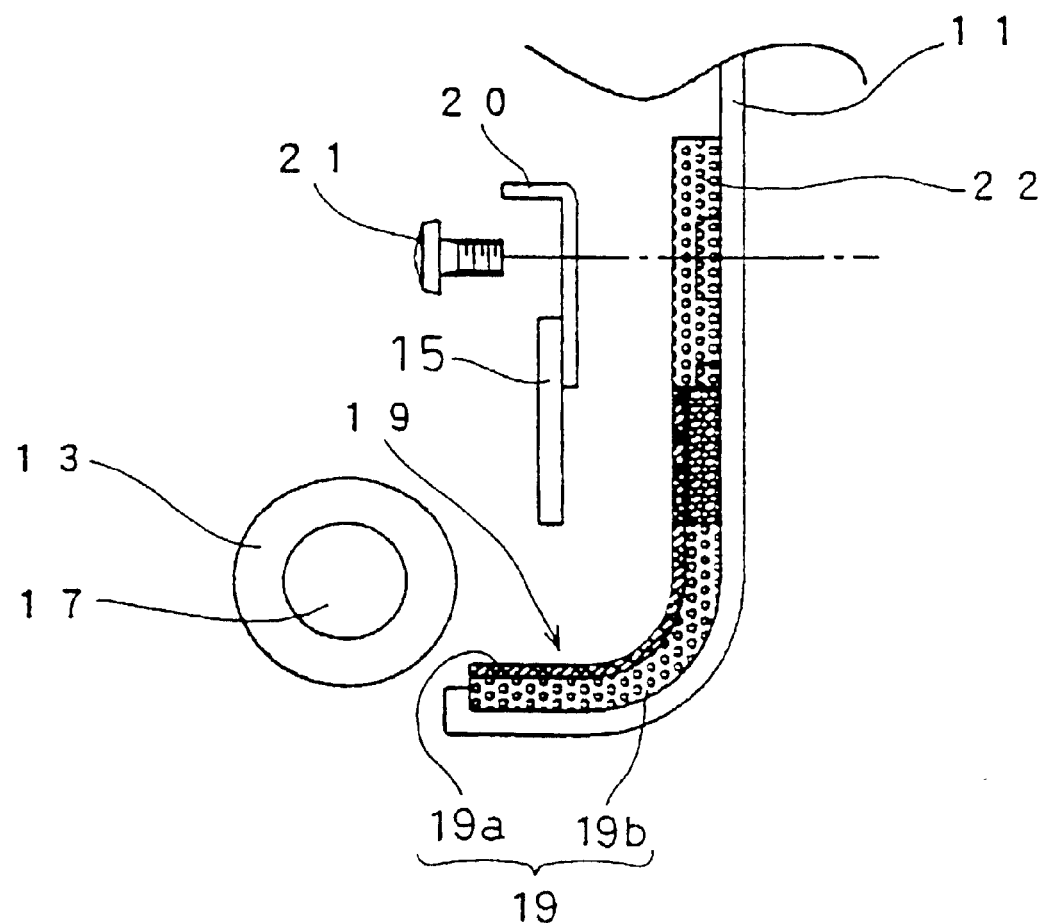
FIG. 13 is a simplified right-hand side view showing the developing apparatus 3 depicted in FIG. 10, with the blade 15 and the developing roller 13 removed.
Figure 14A:
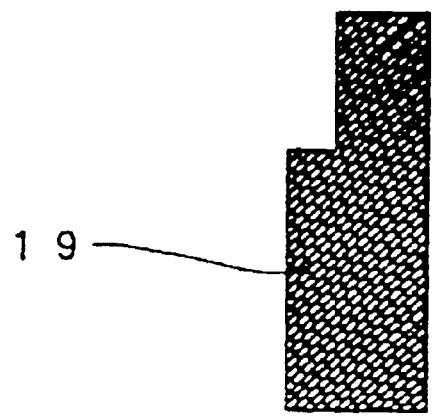
FIGS. 14A and 14B are a front view and a right-hand side view, respectively, each showing the side seal 19, depicted in FIG. 10, in an unmounted state.
Figure 14B:
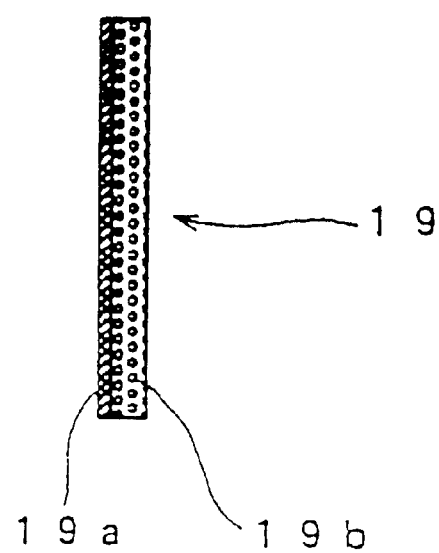
Figure 15A:
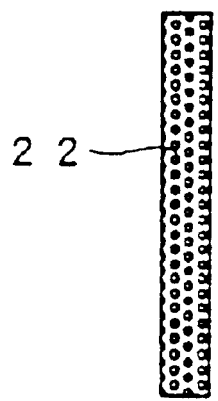
FIGS. 15A and 15B are a front view and a right-hand side view, respectively, each showing the blade rear seal 22, depicted in FIG. 10, in an unmounted state.
Figure 15B:
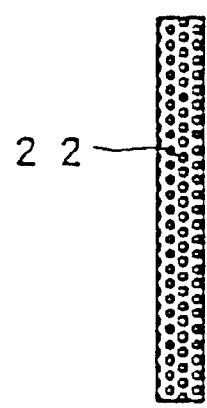

FIG. 4 illustrates a developing roller 71, with the periphery of its one axial end kept in a sealed state. Note that the periphery of the other axial end thereof is also kept in the same state. Specifically, a rotary shaft 72 of the developing roller 71 is rotatably supported, at its axial opposite ends, in a casing 73 by a bearing 74. Provided at each of the opposite ends of the outer circumferential surface of the developing roller 71 is a side seal 75, which serves to prevent toner from leaking through the bearing 74, provided at the side wall of the casing 73, to the outside. The side seal 75 of the embodiment is so formed as to have a pile configuration using yarns including the porous hollow fiber 40 as shown in FIG. 1B. The side seal 75 also serves as a rear seal of a blade 76. The blade 76 is attached via a fitting plate 77 to the casing 73. The fitting plate 77 is fixed to the casing 73 with a bolt 78. The rear end of the blade 76 is also covered with part of the side seal 75, thereby preventing leakage of toner.

FIGS. 5A and 5B illustrate the sectional configuration, looking from the right-hand side of FIG. 4, with FIG. 5A showing a state taken along line A—A of FIG. 4, and FIG. 5B showing a state taken along line B—B of FIG. 4. As shown in FIG. 5A, being made of hollow fiber, the side seal 75 is smaller in torque than a conventional sealing material under the same condition of compression amount, and its torque can be reduced to about two-thirds the torque of the conventional one. As shown in FIG. 5B, the blade 76 is sunk in the fiber of the side seal 75 to fill a gap, thereby blocking intrusion of toner. Thus, sealing of the stepped portion can be achieved properly. Moreover, using hollow fiber for the side seal 75 makes it possible to reduce the load on the blade 76 at the end portion.

FIGS. 6A and 6B are views of the casing 73 incorporating the developing roller 71 and the side seal 75, and an assembly obtained by attaching the blade 76 to the fitting plate 77, illustrating how the latter is mounted in the former. FIG. 7 is a view of the casing 73 incorporating the side seal 75, the assembly obtained by attaching the blade 76 to the fitting plate 77, and the developing roller 71, illustrating a state in which the assembly and the developing roller 71 are separated from the casing 73. FIGS. 8A and 8B illustrate the contour of the side seal 75 in an unmounted state, with FIG. 8A showing the front face, and FIG. 8B showing the right-hand face. For production of the side seal 75, a pile-like sealing material made of yarns of hollow or porous fiber is used. Thus, since the sealing material is contacted on its tips of naps by the rotary body, even if a contact pressure exerted on the rotary body is low, sufficient sealability can be attained. Note that the pile of the side seal 75 may be subjected to lie-down treatment, that is, may be so treated that naps of yarns constituting the pile-like sealing material are caused to lie down in the rotation direction of the rotary body. By so doing, a movement direction of toner is aligned with the rotation direction, thereby preventing the toner from moving along the axial direction. Hence, by subjecting the pile to polishing treatment so as to cause its naps to lie down in the rotation direction of the developing roller 71, further reduction in torque can be achieved.

In this embodiment, since a pile seal made of hollow or porous fiber is used for production of the side seal 75, compression can be carried out at a light load. Hence, unlike the conventional construction, there is no need to prepare two separate components, like the side seal 19 and the blade rear seal 22, for each of a region requiring a heavy compressive force (heavy load) and a region requiring a light compressive force (light load), and thus sealing can be achieved satisfactorily with the side seal 75 alone. This makes it possible to reduce the number of constituent components. Moreover, there is no need to ensure high dimensional accuracy to avoid creating a gap in the stepped portion. Since the pile is made freely deformable, it is possible to decrease the possibility of creating a gap in a seam between the side seal and other component, thereby preventing intrusion of toner. Therefore, the side seal 75, unlike the conventional side seal 19, is not required to have a complicated configuration.

The side seal 75 may preferably be formed by mixedly weaving the yarns of hollow or porous hollow fiber 40 and yarns of non-hollow fiber. The yarns of hollow or porous fiber exhibit low repulsive elasticity, whereas the yarns of non-hollow fiber exhibit high repulsive elasticity. Therefore, by mixedly weaving these yarns of different types, the repulsive elasticity can be adjusted adequately, and thus it is possible to impart elasticity to the resultant side seal in part, as required. In addition, yarns of electrically conductive fiber may be mixed with the yarns for forming the side seal 75. This makes the side seal less prone to being friction-charged, even when used for sealing of a mobile portion, resulting in an advantage in reducing clogging caused by powder coagulation.

Although, in the embodiment described above, sealing is performed on the end portion of the developing roller 31, 61, 71 to prevent leakage of toner, the invention may be applicable to sealing of an image carrier such as a photoconductive drum, or other apparatuses that deal with powder particles. Moreover, the invention may be practiced as a typical sealing material such as a packing or gasket. Listed in Table 1 below are examples of basic physical properties of the sealing material having a pile configuration made of the porous hollow fiber 40 shown in FIG. 1B.

TABLE 1

| Evaluation item/ | Test sample of sealing material | | |
|---|---|---|---|
| Test method | A | B | C |
| Density | 420/ square inch 21 × 20 | 840/ square inch 21 × 40 | 1050/ square inch 21 × 50 |
| Compressive load Mpa JIS K-6254 | 0.03 | 0.08 | 0.11 |
| Compressive permanent deformation % ASTM D 1056 | 12.5 | 6.88 | 3.13 |
| Conductive resistance value | $10^6 \Omega$–$10^{12} \Omega$ | $10^6 \Omega$–$10^{12} \Omega$ | $10^6 \Omega$–$10^{12} \Omega$ |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method of using a rotary body sealing material, comprising the steps of:
   providing a rotary body sealing material for sealing an end portion of a rotary body which carries powder particles, wherein yarns of hollow fibers or porous hollow fibers are included as raw materials; and
   applying the rotary body sealing material to a stepped portion.

2. A rotary body sealing material for sealing an end portion of a rotary body which carries powder particles, comprising:
   yarns of hollow fibers or porous hollow fibers; and
   yarns of non-hollow fibers, the yarns of non-hollow fibers being mixedly woven so that the rotary body sealing material exhibits an appropriate level of repulsive elasticity to prevent powder particles from moving out of the end portion of the rotary body when the end portion of the rotary body is pressed against a wall of a casing.

3. The rotary body sealing material as claimed in claim 2, wherein the yarns of the hollow fibers or the porous hollow fibers are formed into a pile configuration.

4. The rotary body sealing material as claimed in claim 3, wherein the yarns formed into a pile configuration are so treated as to lie down in a direction in which the rotary body is rotated in order to prevent powder particles from moving in an axial direction of the rotary body.

5. The rotary body sealing material as claimed in claim 2, wherein yarns of electrically conductive fibers are placed in the yarns of hollow fibers or porous hollow fibers.

6. A developing apparatus comprising:
   a developing roller carrying developer powder for use in electrophotographic image formation; and
   a rotary body sealing material as a side seal including:
   yarns of hollow fibers or porous hollow fibers; and
   yarns of non-hollow fibers, the yarns of hollow fibers or porous hollow fibers and the yarns of non-hollow fibers being mixedly woven so that the rotary body sealing material exhibits an appropriate level of repulsive elasticity to prevent powder particles from moving out of the end portion of the rotary body when the end portion of the rotary body is pressed against a wall of a casing, the side seal being provided at an end of the developing roller.

7. The developing apparatus as claimed in claim 6, wherein the side seal is formed integrally with a rear seal at an end portion of a developer regulating member for controlling a layer thickness of a developer carried by the developing roller.

8. A rotary body sealing material for sealing an end portion of a rotary body which carries powder particles, comprising:
   a fabric made of yarns of hollow fibers or porous hollow fibers; and
   wherein yarns of hollow fibers or porous hollow fibers, and yarns of non-hollow fibers are mixedly woven so that the rotary body sealing material exhibits an appropriate level of repulsive elasticity to prevent powder particles from moving out of the end portion of the rotary body when the end portion of the rotary body is pressed against a wall of a casing.

9. A rotary body sealing material for sealing an end portion of a rotary body which carries powder particles, comprising:
   a fabric made of yarns of hollow fibers or porous hollow fibers;
   wherein the yarns of the hollow fibers or porous hollow fibers are formed into a pile configuration; and
   wherein yarns of hollow fibers or porous hollow fibers, and yarns of non-hollow fibers are mixedly woven so that the rotary body sealing material exhibits an appropriate level of repulsive elasticity to prevent powder particles from moving out of the end portion of the rotary body when the end portion of the rotary body is pressed against a wall of a casing.

10. A rotary body sealing material for sealing an end portion of a rotary body which carries powder particles, comprising:
    a fabric made of yarns of hollow fibers or porous hollow fibers;
    wherein the yarns of the hollow fibers or porous hollow fibers are formed into a pile configuration;
    wherein the yarns formed into a pile configuration are so treated as to lie down in a direction in which the rotary body is rotated in order to prevent powder particles from moving in an axial direction of the rotary body; and
    wherein yarns of hollow fibers or porous hollow fibers, and yarns of non-hollow fibers are mixedly woven so that the rotary body sealing material exhibits an appropriate level of repulsive elasticity to prevent powder particles from moving out of the end portion of the rotary body when the end portion of the rotary body is pressed against a wall of a casing.

11. The method of using a rotary body sealing material, comprising the steps of:
    providing a rotary body sealing material for sealing an end portion of a rotary body which carries powder particles, including:
    a fabric made of yarns of hollow fibers or porous hollow fibers; and
    applying the rotary body sealing material to a stepped portion.

12. A developing apparatus comprising:
    a developing roller carrying developer powder for use in electrophotographic image formation;
    a rotary body sealing material as a side seal including:
    a fabric made of yarns of hollow fibers or porous hollow fibers, the side seal being provided at an end of the developing roller; and
    wherein the side seal is formed integrally with a rear seal at an end portion of a developer regulating member for controlling a layer thickness of a developer carried by the developing roller.

* * * * *